United States Patent [19]

Fukui

[11] Patent Number: 5,293,076
[45] Date of Patent: Mar. 8, 1994

[54] VEHICLE CONTROL APPARATUS

[75] Inventor: Wataru Fukui, Himeji, Japan

[73] Assignee: Mitsubishi Denki Kabushiki Kaisha, Tokyo, Japan

[21] Appl. No.: 868,131

[22] Filed: Apr. 14, 1992

[30] Foreign Application Priority Data

| Apr. 16, 1991 | [JP] | Japan | 3-082749 |
| Apr. 17, 1991 | [JP] | Japan | 3-084950 |
| Apr. 18, 1991 | [JP] | Japan | 3-086513 |

[51] Int. Cl.$^5$ .......................... H02J 7/00; H02J 7/14
[52] U.S. Cl. ............................ 290/40 C; 290/50; 322/8; 361/92
[58] Field of Search ............... 290/40 C, 50; 320/40; 322/7, 8, 29; 361/92

[56] References Cited

U.S. PATENT DOCUMENTS

| 704,864 | 7/1902 | Creveling | 322/7 |
| 3,474,296 | 10/1969 | Rickey | 320/40 |
| 3,522,481 | 8/1970 | Terzic | 320/40 |
| 4,132,942 | 1/1979 | Yamamoto | 290/50 |
| 4,137,557 | 1/1979 | Cianiello et al. | 361/92 |

FOREIGN PATENT DOCUMENTS

| 3814551 | 8/1989 | Fed. Rep. of Germany . |
| 3729968 | 5/1990 | Fed. Rep. of Germany . |
| 3936638 | 3/1991 | Fed. Rep. of Germany . |
| 39584 | 3/1982 | Japan . |
| 180284 | 8/1987 | Japan . |
| 156153 | 6/1989 | Japan . |
| 136550 | 5/1990 | Japan . |

Primary Examiner—A. D. Pellinen
Assistant Examiner—Robert Lloyd Hoover
Attorney, Agent, or Firm—Sughrue, Mion, Zinn, Macpeak and Seas

[57] ABSTRACT

A control apparatus for a vehicle equipped with an engine senses a condition indicating the capacity of the battery of the vehicle. When the capacity is below a prescribed level, the drive current to an actuator of the vehicle is adjusted to prevent the battery from becoming excessively discharged. In one form of the invention, the drive current is decreased to decrease the load on the battery. In another form of the invention, the actuator is controlled to increase the engine speed, thereby increasing the output of a generator driven by the engine. In another form of the invention, the actuator is controlled to stop the engine. When the engine is restarted, the initial rotational speed of the engine is high enough for the generator to recharge the battery.

15 Claims, 9 Drawing Sheets

VEHICLE CONTROL APPARATUS

BACKGROUND OF THE INVENTION

This invention relates to a control apparatus for an arrangement in which an electrical generator is driven by an internal combustion engine. More particularly but not exclusively, it relates to a control apparatus for a vehicle such as automobile or a boat which can prevent failure of an electrical control system for the vehicle when an engine of the vehicle is operating at a low speed.

Automobiles, boats, and other types of vehicles powered by an internal combustion engine are frequently equipped with a wide variety of electrically-powered actuators, such as windshield wipers, fuel pumps, head lights, and ignition coils. Furthermore, modern vehicles commonly have an electronic control unit for controlling the engine. When the engine of such a vehicle is rotating above a certain speed, the electrical power for the actuators and the control unit is provided by an electrical generator driven by the engine. However, when the engine is running at a low rotational speed, such as when an automobile is idling or a boat is trolling, the output of the generator may be insufficient to power all the actuators, so at this time power is drawn from a storage battery of the vehicle. If the engine is run at a low rotational speed for a long period, the charge on the battery will gradually decrease, and the charge may fall to a level at which the battery can no longer supply sufficient current to the actuators or the control unit. As a result, they may malfunction and cause the engine of the vehicle to stop.

SUMMARY OF THE INVENTION

Accordingly, it is an object of the present invention to provide a control apparatus which can prevent a battery associated with an engine from being discharged to the point that the engine stops during low speed operation of the engine.

It is another object of the present invention to provide a vehicle control method which can prevent a battery of a vehicle from being excessively discharged during low speed operation of the engine of the vehicle.

A control apparatus for a vehicle according to the present invention senses a condition indicating the capacity of a battery of the vehicle. When the capacity is below a prescribed level, the drive current for an actuator of the vehicle is controlled so as to prevent the battery from becoming excessively discharged.

In one form of the present invention, the drive current is decreased to decrease the load on the battery when the battery capacity falls below a prescribed level. The decrease in the drive current decreases the rate at which the battery is discharged, so the possibility of the engine stopping because of the battery becoming excessively discharged is decreased.

In another form of the present invention, the actuator is a device which influences the engine rotational speed. When the battery capacity falls below a prescribed level, the actuator is controlled to increase the engine speed, thereby increasing the output of a generator which is driven by the engine and which recharges the battery.

In still another form of the present invention, the actuator is a device which can stop the operation of the engine. When the battery capacity falls below a prescribed level, the actuator is controlled so as to stop the engine. When the engine is restarted by an operator of the vehicle, the initial rotational speed of the engine is high enough for the generator of the vehicle to recharge the battery.

Any condition indicative of the electrical output capacity of the battery can be employed, such as the voltage of the battery or the specific gravity of battery fluid of the battery.

A control method for a vehicle according to the present invention comprises sensing a condition indicating the capacity of a battery of the vehicle and adjusting the drive current for an actuator of the vehicle when the battery capacity falls below a prescribed level so as to prevent the battery from becoming excessively discharged.

DESCRIPTION OF THE PREFERRED EMBODIMENTS

Figure 1:
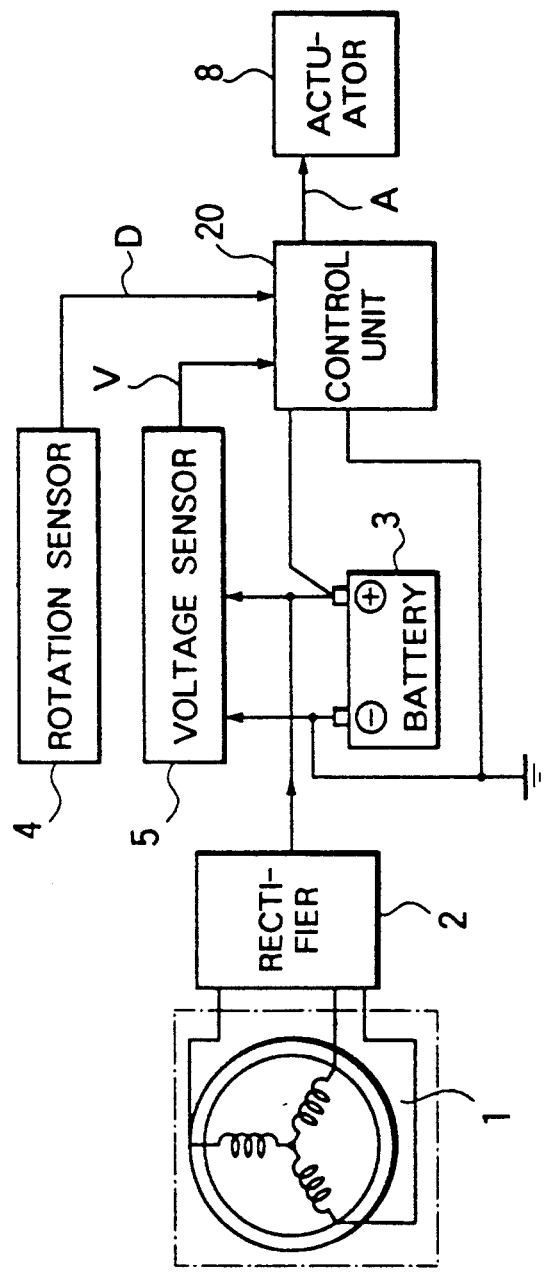
FIG. 1 is a block diagram of a first embodiment of a control apparatus according to the present invention.

A number of preferred embodiments of a control apparatus according to the present invention will now be described while referring to the accompanying drawings. FIG. 1 is a block diagram of a first embodiment as applied to an unillustrated vehicle equipped with an unillustrated internal combustion engine. The present invention is particularly suited for use with automobiles or small boats equipped with outboard engines, but it can be applied to any type of vehicle having electrical actuators which receive electrical power from a generator driven by the engine and from a battery.

As shown in FIG. 1 the vehicle is equipped with a generator 1 which is driven by the engine to generate electrical power. In the present embodiment, the generator 1 is an alternating current generator, but it can instead be a direct current generator. The generator 1 is connected to a rectifier 2, which provides a direct current output to a storage battery 3. A rotation sensor 4 senses the rotation of a portion of the engine (such as the crankshaft or the camshaft) and generates an output signal D every prescribed number of degrees of crankshaft rotation. A voltage sensor 5 senses the voltage of the battery 3 and generates an output signal V indicating the battery voltage. The output signals D and V are provided to a control unit 20 which is connected to the battery 3 so as to receive power from the battery 3 or the generator 1. Based on the input signals D and V, the control unit 20 produces a drive current A that powers an actuator 8 for the vehicle. The actuator 8 can be any of the electrically-powered actuators typically mounted on a vehicle, such as a fuel pump, an ignition coil, a motor-operated throttle valve, a starter motor, or an electromagnetic suspension. Preferably, the actuator 8 is a device which consumes a significant portion of the output power of the generator 1 or the battery 3. In the present embodiment, the actuator 8 is a fuel pump. When the control unit 20 determines that the engine rotational speed is below a prescribed speed and the voltage of the battery is below a prescribed voltage, the control unit 20 decreases the magnitude of the drive current A supplied to the actuator 8 to prevent the battery 3 from becoming excessively discharged.

The control unit 20 can be a device which controls the overall operation of the engine, such as a conventional electronic control unit for an automotive engine, or it can be a device which controls only the actuator for which the drive current is to be limited.

Figure 2:
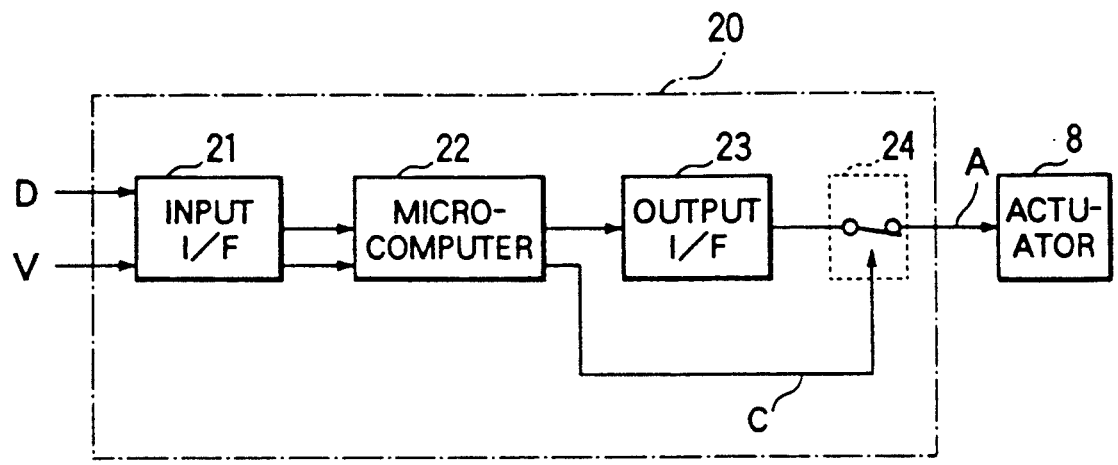
FIG. 2 is a block diagram of the control unit of FIG. 1.

FIG. 2 is a block diagram of an example of the structure of the control unit 20. It includes an input interface 21 which receives the output signals D and V from the rotation sensor 4 and the voltage sensor 5, respectively, and performs signal processing such as wave form shaping of the received signals. The processed signals are then input to a microcomputer 22. The microcomputer 22 calculates a suitable drive current A for the actuator 8 based on various operating parameters of the vehicle. Electrical signals indicating these operating parameters are input to the microcomputer 22 via the input interface 21 from various sensors, such as sensors 4 and 5 or other unillustrated sensors. Algorithms for use in determining the drive current for an actuator based on various operating parameters of a vehicle are well known in the art, and the microcomputer 22 can employ any suitable algorithm. The microcomputer 22 generates a control signal indicating the magnitude of the calculated drive current A for the actuator 8. This control signal is provided to an output interface 23, which outputs the drive current A. The microcomputer 22 also determines the power generating capacity of the generator 1 and the battery 3 based on the output signals from the rotation sensor 4 and the voltage sensor 5. When the microcomputer 22 determines that the generating capacity is low, it outputs a control signal C for controlling a switching circuit 24. The switching circuit 24 is connected in series with the actuator 8 so as to control the magnitude of the drive current A. In the illustrated embodiment, the switching circuit 24 is connected between the output interface 23 and the actuator 8, but it can instead be connected between the actuator 8 and ground. When the microcomputer 22 generates the control signal C, the switching circuit 24 decreases the drive current A provided to the actuator 8 below the normal value which was calculated by the microcomputer 22 based on the vehicle operating parameters.

Figure 3:
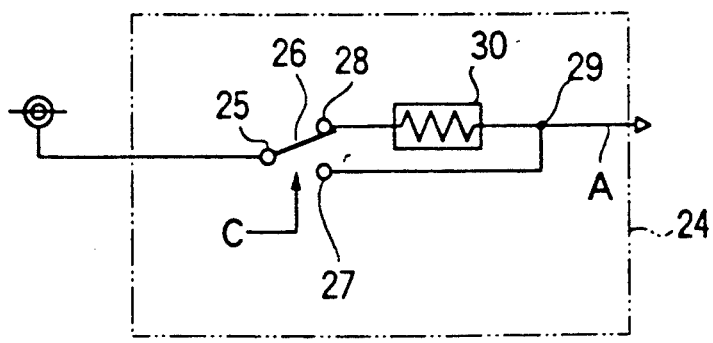
FIG. 3 is a schematic diagram of an example of the switching it of FIG. 2.

The switching circuit 24 can be any device which can adjust the level of the drive current A to the actuator 8. FIG. 3 is a circuit diagram of one example of the switching circuit 24. In this example, the switching circuit 24 adjusts the drive current A by varying the load resistance seen by the output interface 23. It includes an input terminal 25 connected to the output interface 23 and an output terminal 29 connected to the actuator 8. A movable contact 26 which is connected to the input terminal 25 can be switched between a first position in which it contacts a first fixed contact 27 and a second position in which it contacts a second fixed contact 28. The movable contact 26 is moved between the two positions by an unillustrated drive mechanism in response to the control signal C from the microcomputer 22. The first fixed contact 27 is directly connected to the output terminal 29, while the second fixed contact 28 is connected to the output terminal 29 by a resistor 30. When the engine speed is above the prescribed speed and the battery voltage is above the prescribed voltage, the control signal C is not generated, so the movable contact 26 is in the first position and a normal drive current A is provided to the actuator 8. When the engine speed is below the prescribed speed and the battery voltage is below the prescribed voltage, the microcomputer 22 generates the control signal C, and the movable contact 26 is moved to the second position. The presence of the resistor 30 in series with the actuator 8 decreases the magnitude of the drive current A from its value when the resistor 30 is not connected to the actuator 8 and decreases the rate at which the battery 3 is discharged.

Figure 4:
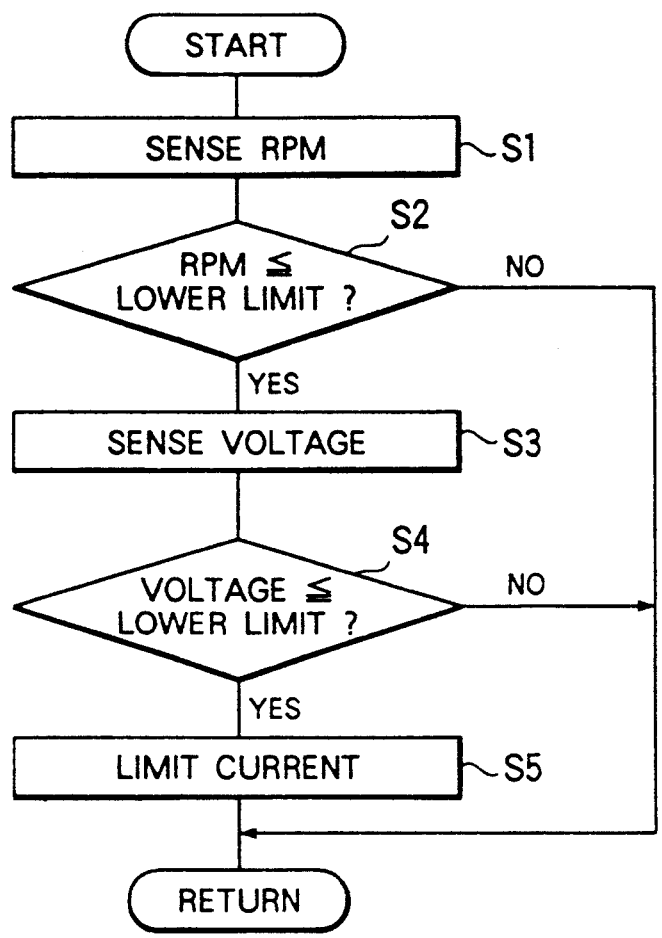
FIG. 4 is a flow chart of the operation of the control unit of FIG. 2.

FIG. 4 is a flow chart of a routine performed at predetermined intervals by the control unit 20 of FIG. 2 to control the drive current A. In Step S1, the output signal D of the rotation sensor 4 is input to the microcomputer 22, which calculates the engine rotational speed based on this signal. In Step S2, the microcomputer 22 determines whether the rotational speed is less than or equal to a predetermined lower speed limit. For example, when the engine is installed in an automobile, the lower speed limit can correspond to the idling speed of the engine, and when the engine is an outboard engine of a boat, the lower speed limit can correspond to the trolling speed of the engine. If the engine rotational speed is greater than the lower speed limit, the microcomputer 22 determines that the generating capacity of the generator 1 is adequate, so a return is performed. However, if the rotational speed is less than or equal to the lower speed limit, it is determined that the generating capacity of the generator 1 is low. Therefore, in Step S3, the voltage signal V is input to the microcomputer 22 from the voltage sensor 5. In Step S4, the microcomputer 22 determines if the battery voltage is less than or equal to a predetermined lower voltage limit. If the battery voltage is greater than the lower voltage limit, it is not necessary to limit the current output by the battery 3, so a return is performed. If a return is performed from Step S2 or Step S4, a control signal C is not generated, so the switching circuit 24 does not limit the drive current A, and the actuator 8 receives a normal drive current A equal to the full value calculated by the microcomputer 22 based on the operating conditions of the vehicle. However, if the battery voltage is less than or equal to the lower voltage limit, then in Step S5, the microcomputer 22 outputs a control signal C to the switching circuit 24 to make the movable contact 26 move from its first position (in which it contacts the first fixed contact 27) to the second position shown in FIG. 3 (in which it contacts the second fixed contact 28). In this position, the load resistance seen by the output interface 23 is increased by the resistor 30, so the drive current A and the rate of discharge of the battery 3 are decreased to levels such that there is little likelihood of the battery 3 becoming excessively discharged. As a result, the battery charge is maintained at a level at which it can power the control unit 20 and the various actuators necessary for engine operation. Therefore, the engine can continue to operate even at low engine speeds. After Step S5, a return is performed.

The movable contact 26 is maintained in its second position until either the rotational speed exceeds the lower speed limit or the battery voltage exceeds the lower voltage limit. Once the rotational speed exceeds the lower speed limit, the output of the generator 1 is sufficient to drive the actuator 8 and to recharge the battery 3, so it is no longer necessary to limit the drive current A.

The actuator 8 is preferably a device which can operate properly over a range of currents and not malfunction when the drive current A is decreased by the switching circuit 24. When the actuator 8 is a fuel pump for the engine, for example, decreasing the drive current A will decrease the fuel supply to the engine. However, during idling or trolling, there is considerable leeway with respect to the amount of fuel required by the engine, so decreasing the drive current A does not cause any problems.

In FIG. 1, only a single actuator 8 is shown, but it is possible for a plurality of actuators to have their drive currents controlled by the control unit 20 in accordance with the battery condition, and the microcomputer 22 can be used to calculate the normal drive current for each of the actuators.

Figure 5:
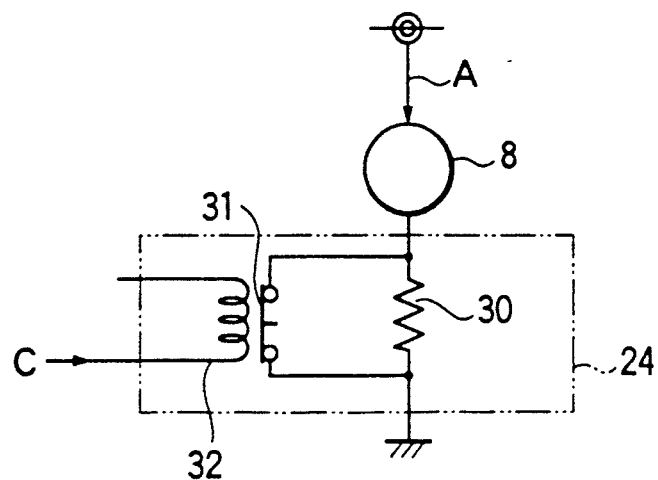
FIG. 5 is a schematic diagram of another example of the switching circuit of FIG. 2.

FIG. 5 illustrates another example of the switching circuit 24. In this example, the switching circuit 24 comprises a normally closed contact 31 connected in parallel with a resistor 30, which is connected in series with the actuator 8 between the actuator 8 and ground, although the switching circuit 24 could instead be connected between the actuator 8 and the output interface 23 of the control unit 20. The normally closed contact 31 is opened when a control signal C from the microcomputer 22 is passed through an energizing coil 32 coupled to the contact 31. The control unit 20 controls the switching circuit 24 of FIG. 5 in the same manner as described with respect to FIG. 4. Namely, when the engine rotational speed is greater than the lower speed limit or the battery voltage is greater than the lower voltage limit, the control signal C is not generated, so the normally closed contact 31 is closed. Therefore, drive current A bypasses the resistor 30 via the contact 31, and the actuator 8 is driven by the full drive current A. When the rotational speed is less than or equal to the lower speed limit and the battery voltage is less than or equal to the lower voltage limit, the microcomputer 22 generates the control signal C and the coil 32 opens contact 31, so the drive current A for the actuator 8 must flow through the resistor 30. As a result, the drive current A is reduced, and the rate of discharge of the battery 3 is decreased. Therefore, as described above, the control unit 20 and the actuator 8 can continue to function properly, even at low engine speeds.

Figure 6:
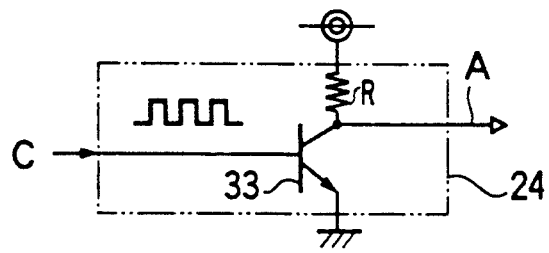
FIG. 6 is a schematic diagram of yet another example of the switching circuit of FIG. 2.

FIG. 6 illustrates another example of a switching circuit 24 that can be employed in the embodiment of FIG. 1. In this example, the switching circuit 24 comprises a transistor 33 having a base which receives the control signal C from the microcomputer 22, a collector which is connected to an unillustrated power supply through a resistor, R, and to the actuator 8, and an emitter which is grounded. When the control signal C has a low value, the transistor 33 is off, so the normal drive current A is supplied to the actuator 8. When the control signal C has a high level, the transistor 33 conducts, so no current is supplied to the actuator 8. By controlling the duty cycle of the control signal C, the time average value of the drive current A can be controlled to a desired level and the battery 3 can be prevented from becoming excessively discharged.

In the mode of operation described with respect to FIG. 4, the drive current A is reduced if the battery voltage is less than or equal to a lower voltage limit. However, if the current limiting of Step S5 in FIG. 4 is performed when the battery voltage is extremely low, the current supplied to the actuator 8 may be too low for the actuator 8 to function properly. If the actuator 8 is one necessary for engine operation, the engine will end up stopping. For example, if the actuator 8 is a fuel pump, when the drive current A falls below a certain level, the fuel pump can no longer supply enough fuel to fuel injectors of the engine to keep the engine running.

Figure 7:
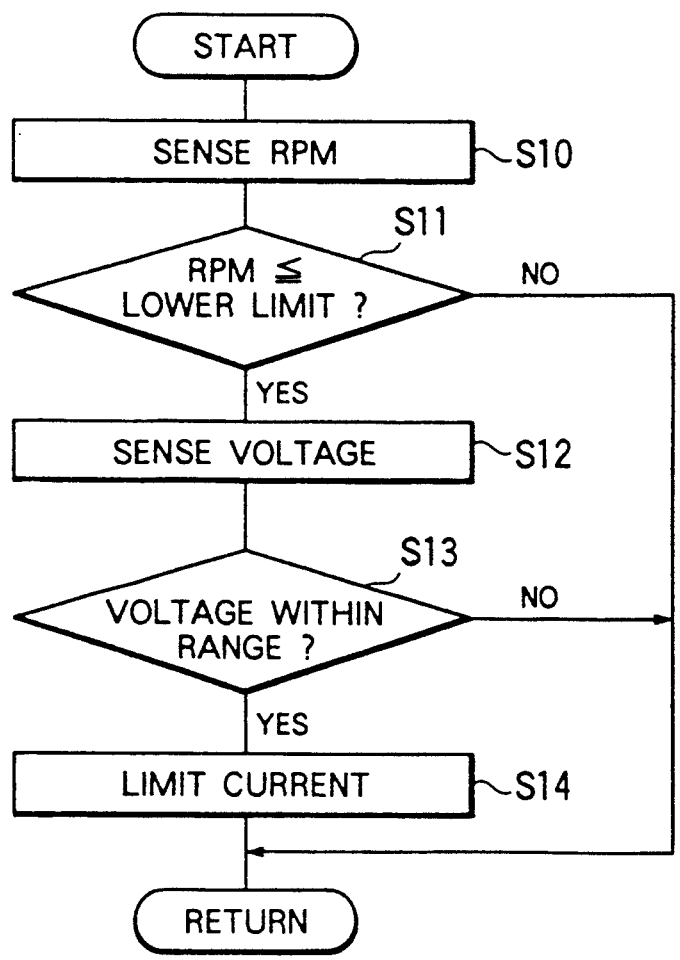
FIG. 7 is a flow chart of another mode of operation of the control unit of FIG. 1.

Therefore, in accordance with another embodiment of the present invention, current limiting is performed only when the voltage of the battery 3 is in a prescribed range between a first voltage, corresponding to the lower voltage limit of Step S2 of FIG. 4, and a second voltage which is a minimal operating voltage for driving the actuator 8. The second voltage is lower than the first voltage. The structure of this embodiment can be the same as that of the embodiment of FIG. 1, and it differs from the embodiment of FIG. 1 only with respect to the routine performed by the microcomputer 22 of the control unit 20. FIG. 7 is a flow chart of this routine, which is performed at predetermined intervals. Steps S10–S12 of this routine are identical to Steps S1–S3 of FIG. 4. After the battery voltage is sensed in Step S12, the microcomputer 22 determines in Step S13 whether the voltage is in the prescribed range defined by the first and second voltages. If the battery voltage is above the prescribed range, then it is not necessary to limit the drive current for the actuator, and if the battery voltage is below the prescribed range, then the battery voltage is too low for current limiting to be performed, so a return is performed, and a control signal C is not generated. However, if the battery voltage is within the prescribed range, then in Step S14, current limiting is performed in the same manner as in Step S5 of FIG. 4, after which a return is performed. As a result of the current limiting, the rate of discharge of the battery 3 is decreased, and the operation of the control unit 20 and the actuator 8 is maintained.

Figure 8:
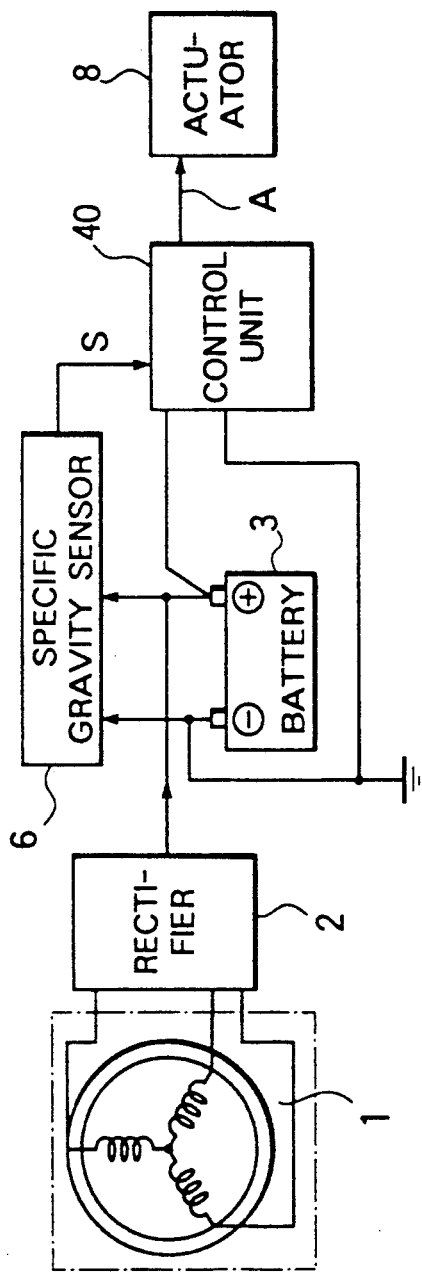
FIG. 8 is a block diagram of another embodiment of the present invention.

FIG. 8 illustrates another embodiment of the present invention. In this embodiment, the condition of a battery 3 is determined by measuring the specific gravity of the battery fluid of the battery 3. Therefore, the rotation sensor 4 and the voltage sensor 5 of FIG. 1 have been replaced by a specific gravity sensor 6. This sensor 6 senses the specific gravity of the battery fluid in the battery 3 and generates a corresponding output signal S, which is provided to a control unit 40. Based on this signal S, the control unit 40 provides an actuator 8 with a drive current A.

Figure 9:
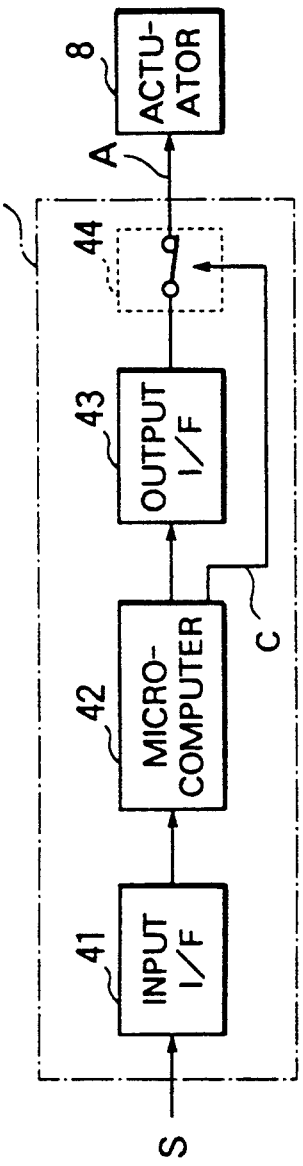
FIG. 9 is a block diagram of the control unit of FIG. 8.

FIG. 9 is a block diagram of the control unit 40. It includes an input interface 41 which receives the output signal S of the specific gravity sensor 6 and performs wave form shaping of the signal, a microcomputer 42 which controls the drive current A of the actuator 8 based on the input signal S, an output interface 43 that generates the drive current A in response to a signal from the microcomputer 42, and a switching circuit 44 which performs current limiting of the drive current A in response to a control signal C from the microcomputer 42. The input interface 41, the output interface 43, and the switching circuit 44 can have the same structure as elements 21, 23, and 24 of FIG. 2. The microcomputer 42 controls the switching circuit 44 so that a normal drive current A based on various operating parameters is provided to the actuator 8 when the specific gravity of the battery 3 is above a predetermined lower limit and controls the switching circuit 44 to limit the drive current A when the specific gravity falls below the lower limit. The normal drive current A can be calculated by the microcomputer 42 on the basis of input signals from various unillustrated sensors.

Figure 10:
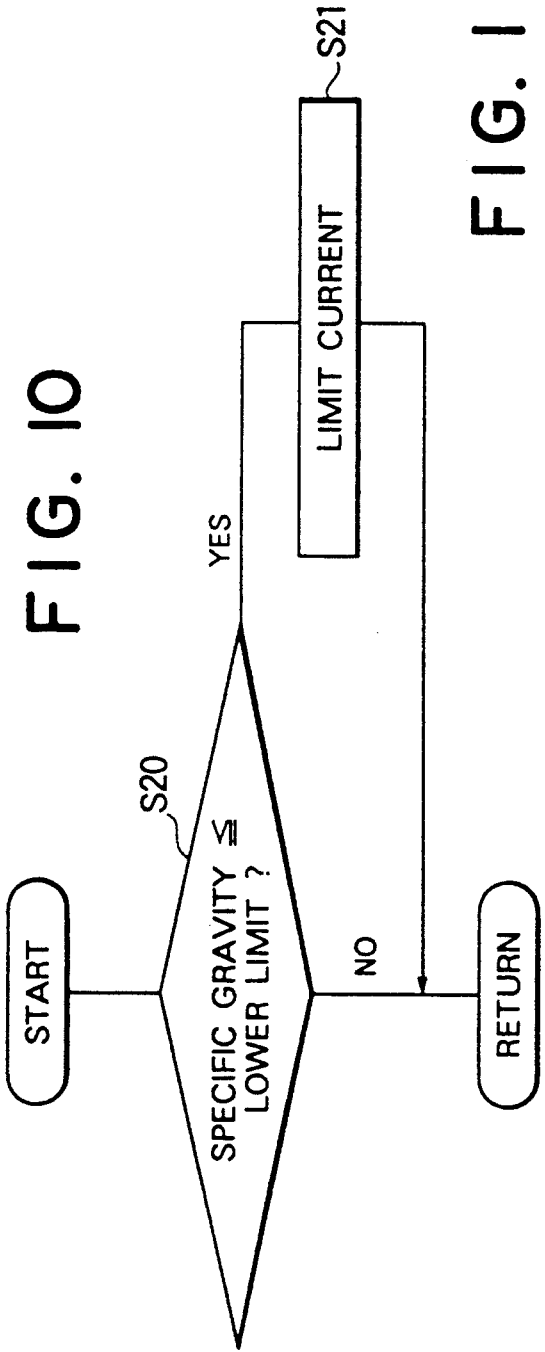
FIG. 10 is a flow chart of the operation of the control unit of FIG. 9.

FIG. 10 is a flow chart of a routine performed at predetermined intervals by the microcomputer 42 of the control unit 40. In Step S20, the microcomputer 42 determines whether the specific gravity of the batter fluid as sensed by the specific gravity sensor 6 is less than or equal to the prescribed lower limit. If it is not, then a return is performed, and a control signal C is not generated. However, if the specific gravity is less than or equal to the lower limit, then in Step S21, current limiting is performed in the same manner as in Step S5 of FIG. 4. Namely, the microcomputer 42 generates a control signal C, and in response the switching circuit 44 decreases the drive current A to the actuator 8. As a result, the rate of discharge of the battery is decreased and the battery voltage is prevented from falling to undesirably low levels, so the operation of the control unit 40 and the actuator 8 can be maintained to keep the engine running, even at low engine speeds.

Figure 11:
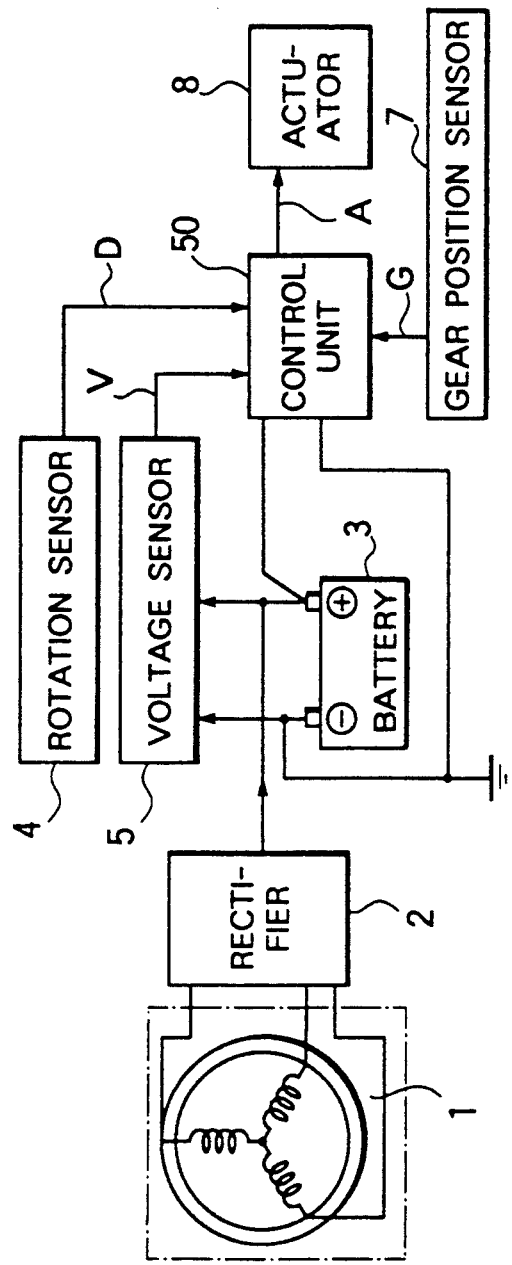
FIG. 11 is a block diagram of another embodiment of the present invention.

FIG. 11 is a block diagram of another embodiment of the present invention. In this embodiment, an actuator 8 which affects the rotational speed of the engine is controlled so as to increase the engine rotational speed when the engine rotational speed is below a prescribed speed and the battery voltage is below a prescribed voltage and the transmission of the vehicle is in neutral. The structure of this embodiment is similar to that of the embodiment of FIG. 1, and elements 1-5 of FIG. 11 correspond to elements 1-5 of FIG. 1. This embodiment further includes a gear position sensor 7 which senses when a transmission to which the engine is connected is in neutral and generates a corresponding output signal G. The output signals from the rotation sensor 4, the voltage sensor 5, and the gear position sensor 7 are provided to a control unit 50, which controls the drive current A for the actuator 8 based on these signals.

Figure 12:
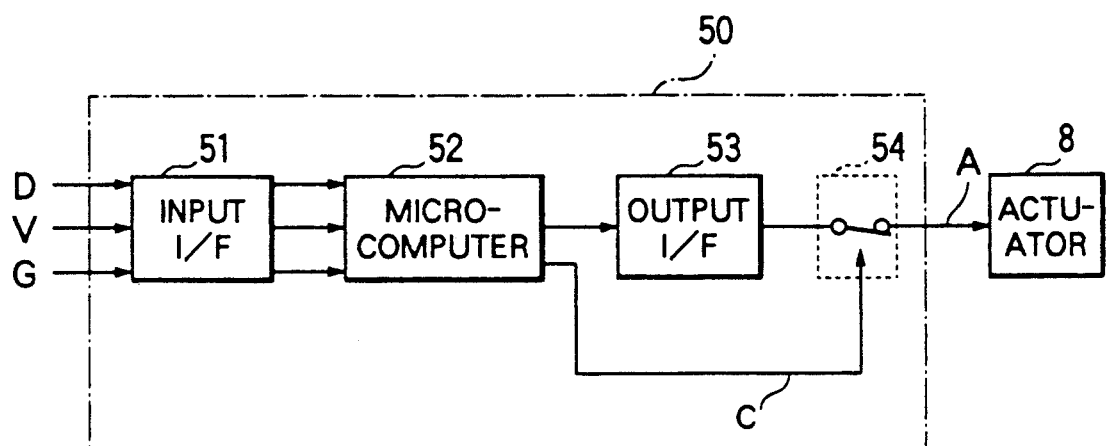
FIG. 12 is a block diagram of the control unit of FIG. 11.

FIG. 12 is a block diagram schematically illustrating the structure of the control unit 50. It includes an input interface 51 which performs wave form shaping of signals D, V, and G from sensors 4, 5, and 7 and provides the processed signals to a microcomputer 52. On the basis of the input signals, the microcomputer 52 controls an output interface 53 to provide a drive current A to the actuator 8. The microcomputer 52 also generates a switching control signal C for a switching circuit 54 connected in series with the actuator 8. The switching circuit 54 is shown connected between the output interface 53 and the actuator 8, but it can instead be connected between the actuator 8 and ground. The switching circuit 54 can be a circuit which varies the drive current A between two or more non-zero levels, such as the circuit shown in FIG. 3, or it can be a circuit with an open state and a closed state which completely cuts off the drive current A to the actuator 8 when the switching circuit 54 is in its open state.

Figure 13:
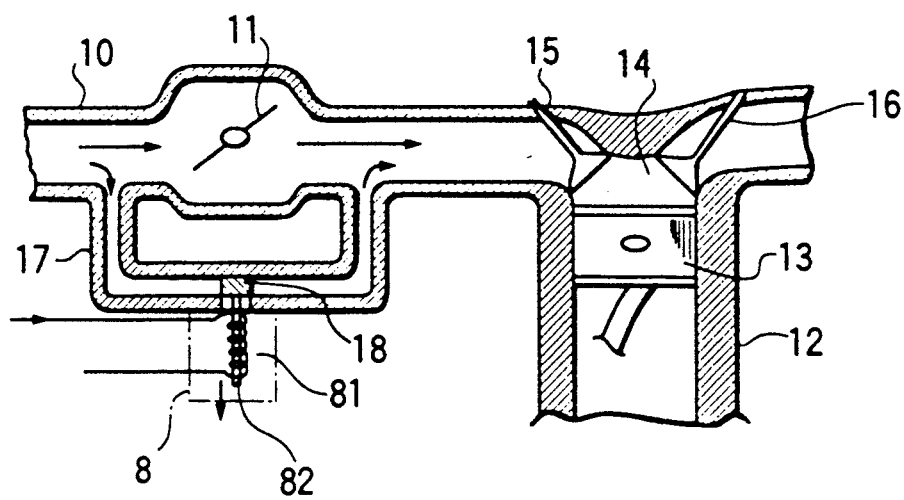
FIG. 13 is a schematic cross-sectional view of a portion of an engine to which the embodiment of FIG. 11 is applied.

The actuator 8 can be any device which can be controlled to vary the rotational speed of the engine. In the present embodiment, the actuator 8 is a device which opens and closes a bypass valve of a throttle bypass. FIG. 13 is a cross-sectional view of a portion of an internal combustion engine equipped with this actuator 8. In FIG. 13, an air intake pipe 10 is connected to an engine cylinder 12 in which a piston 13 is slidably disposed. The cylinder 12 has a combustion chamber 14, an intake valve 15, and an exhaust valve 16. A throttle valve 11 is rotatably mounted in the air intake pipe 10 for movement in response to depression of an unillustrated accelerator pedal. A throttle bypass 17 has a first end connected to the air intake pipe 10 on the upstream side of the throttle valve 11 and a second end connected to the air intake pipe 10 on the downstream side of the throttle valve 11. A bypass valve 18 for opening and closing the bypass 17 is disposed in the bypass 17. When the bypass valve 18 is open, an increased volume of air can enter the engine by the bypass 17, increasing the engine rotational speed. The bypass valve 18 is opened and closed by means of the actuator 8, which includes a solenoid 81 which is energized by the drive current A from the control unit 50 and a plunger 82 which is movably disposed inside the solenoid 81 and magnetically coupled thereto. One end of the plunger 82 is connected to the bypass valve 18. When the solenoid 81 is not energized, the bypass valve 18 is in its closed position, and when the solenoid 81 is energized, the plunger 82 is moved by the solenoid 81 to open the bypass valve 18.

In this embodiment, the switching circuit 54 of the control unit 50 is in an open state when no control signal C is generated by the microcomputer 52. In the open state, a drive current A is not provided to the actuator 8, and the bypass valve 18 is maintained in a closed state. However, when the control signal C is generated, the switching circuit 54 closes to provide drive current A to the actuator 8, and the bypass valve 18 is opened to increase the engine speed.

Figure 14:
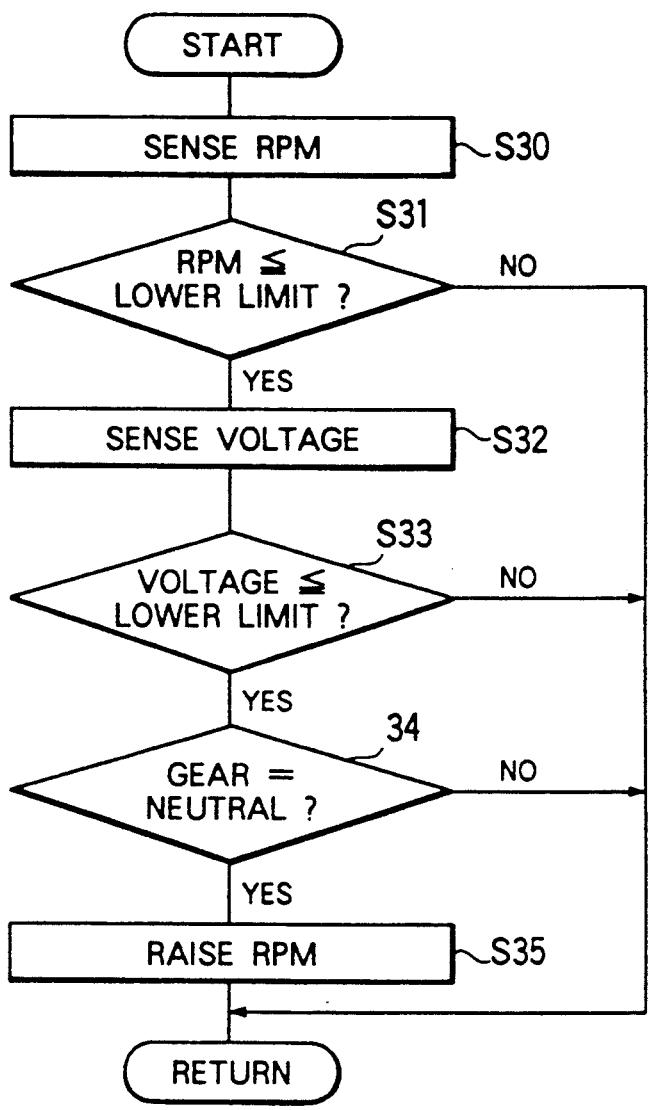
FIG. 14 is a flow chart of the operation of the control unit of FIG. 12.

FIG. 14 is a flow chart of a routine performed at predetermined intervals by the microcomputer 52 to control the actuator 8. In Step S30, the output signal D from the rotation sensor 4 is input to the microcomputer 52, which calculates the engine rotational speed. In Step S31, the microcomputer 52 determines whether the rotational speed is less than or equal to a predetermined lower speed limit, which can correspond, for example, to the idle speed of an automotive engine or to the trolling speed of an outboard engine of a boat. If the engine rotational speed is greater than the lower speed limit, a return is performed, and a control signal C is not generated. However, if the engine rotational speed is less than or equal to the lower limit, in Step S32, the voltage signal V is input from the voltage sensor 5, and in Step S33, the microcomputer 52 determines if the battery voltage is less than or equal to a predetermined lower voltage limit. If the battery voltage is greater than the lower voltage limit, it is not necessary to take any action, so a return is performed, and a control signal C is not generated. However, if the battery voltage is less than or equal to the lower voltage limit, it is desirable to increase the engine rotational speed in order to increase the output of the generator 1. Therefore, in Step S34, the microcomputer 52 determines whether the transmission is in neutral based on the output signal G of the gear position sensor 7. If the transmission is not in neutral, then a return is performed without a control signal C being generated, since raising the engine speed when the transmission is in a forward or reverse gear could cause the vehicle to accelerate forward or backwards and therefore is dangerous. However, if the transmission is in neutral, then in Step S35, the microcomputer 52 generates a control signal C which causes the switching circuit 54 to close and allow drive current A to be provided to the actuator 8. The drive current A energizes the actuator 8 to open the bypass valve 18 and increase the air intake rate into the engine, thereby increasing the engine rotational speed. The increased engine speed increases the output of the generator 1, which charges the battery 3 and prevents the battery voltage from falling to a level which could cause the control unit 50 or the actuator 8 to fail.

In the preceding description, the drive current A supplied to the actuator 8 was switched in a stepwise manner between a full value and a zero value. However, if another type of actuator is employed, the drive current A can be varied among a plurality of nonzero values, either in a stepwise or a continuous manner. Other examples of suitable actuators are a motor for opening and closing the throttle valve 11, an ignition coil, and a fuel pump. When the actuator is a motor for the throttle valve 11, the actuator can adjust the engine speed by increasing the opening of the throttle valve 11. When the actuator is an ignition coil, the engine speed can be adjusted by controlling the firing angle of the spark plugs of the engine. For example, the engine speed can be increased by advancing the firing angle. When the actuator is a fuel pump, the engine speed can be increased by adjusting the fuel supply rate, which adjusts the fuel-air ratio.

In the embodiment of FIG. 11, the condition of the battery 3 is determined by measuring its voltage. However, it can instead be determined by measuring the specific gravity of the battery fluid, as in the embodiment of FIG. 8.

Figure 15:
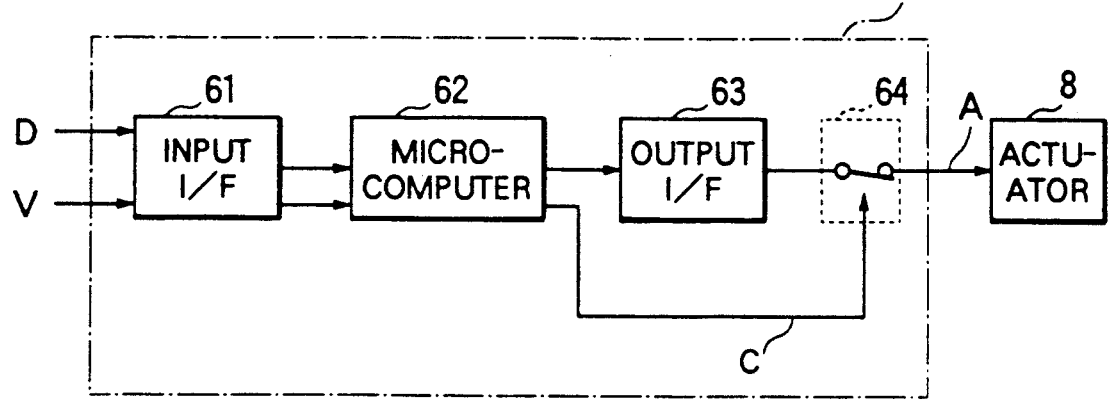
FIG. 15 is a block diagram of the control unit of another embodiment of the present invention

FIG. 15 is a block diagram of a control unit 60 of another embodiment of the present invention in which the drive current A for an actuator 8 is cut off in order to stop the engine when the engine rotational speed and the battery voltage are below prescribed levels. Except for the control unit 60, the structure of this embodiment is similar to that of the embodiment of FIG. 1. The control unit 60 includes an input interface 61 which performs wave form shaping of an input signal D from the rotation sensor 4 and an input signal V from the voltage sensor 5. The processed signals are provided by the input interface 61 to a microcomputer 62, which controls an output interface 63 to generate a drive current A for an actuator 8. The microcomputer 62 also generates a control signal C for a switching circuit 64. The switching circuit 64 is connected to the actuator 8 such that it can start or stop the supply of drive current A to the actuator 8. The switching circuit 64 can be connected between the output interface 63 and the actuator 8 as shown in FIG. 15, or it can be connected between the actuator 8 and ground. The switching circuit 64 can be any controllable switch capable of switching the drive current A, such as a power transistor switched on and off by the control signal C or an electromechanical switch operated by the control signal C.

The actuator 8 can be any device which when can be controlled by the control unit 60 to stop the engine. Some examples of a suitable actuator are an ignition coil, a fuel injector, or a fuel pump.

Figure 16:
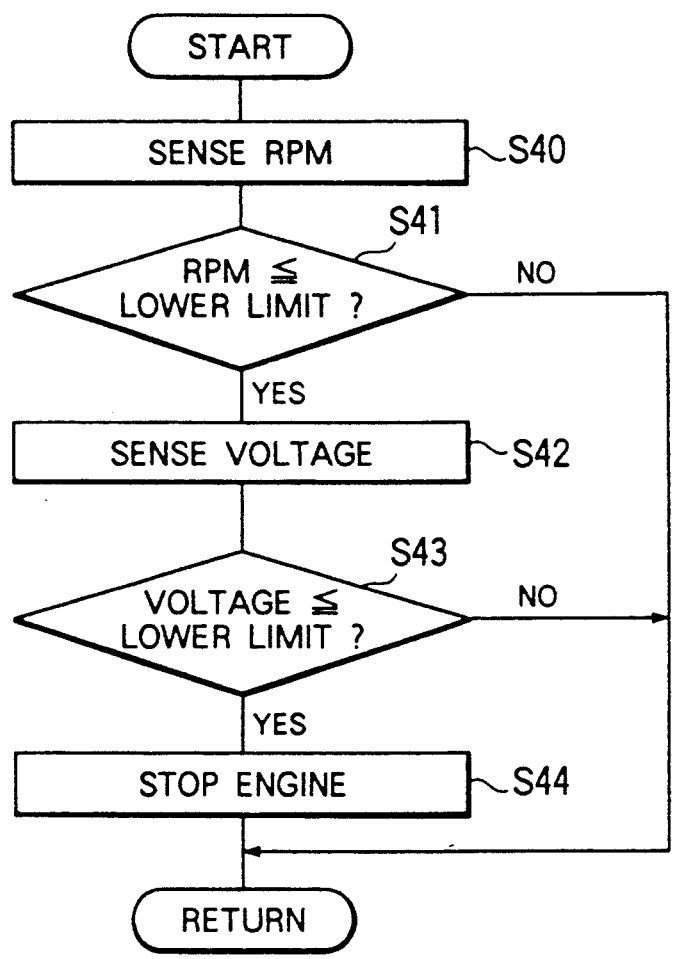
FIG. 16 is a flow chart of the operation of the control unit of FIG. 15.

FIG. 16 is a flow chart of a routine performed at predetermined intervals by the microcomputer 62 during the operation of this embodiment. In Step S40, the output signal D from the rotation sensor 4 is input to the microcomputer 62, which calculates the engine rotational speed based on this signal. In Step S41, the microcomputer 62 determines whether the engine rotational speed is less than or equal to a predetermined lower speed limit, which can correspond, for example, to the idle speed of an automotive engine or to the trolling speed of an outboard engine of a boat. If the engine rotational speed is greater than the lower speed limit, a return is performed, and the control signal C is not generated. However, if the engine rotational speed is less than or equal to the lower speed limit, in Step S42, the voltage signal V is input from the voltage sensor 5, and in Step S43, the microcomputer 62 determines if the battery voltage is less than or equal to a predetermined lower voltage limit. If the voltage is greater than the lower voltage limit, it is not necessary to take any action, so a return is performed, and a control signal C is not generated. However, if the battery voltage is less than or equal to the lower voltage limit, the voltage is in danger of falling to a level at which the microcomputer 62 or the actuator 8 can no longer function. Therefore, in Step S44, the microcomputer 62 provides a control signal C to the switching circuit 64, and the switching circuit 64 cuts off the drive current A to the actuator 8, and the actuator 8 stops working. This causes the engine to stop. The operator of the vehicle must then restart the engine, and the rotational speed of the engine when it restarts will be high enough for the generator 1 to restore the battery voltage to a level high enough to prevent failure of the control unit 60.

In the embodiment of FIG. 15, the condition of the battery 3 is determined by measuring its voltage. However, it can instead be determined by measuring the specific gravity of the battery fluid, as in the embodiment of FIG. 8.

In the preceding embodiments, the magnitude of the drive current A during normal operation of the actuator 8 is calculated by the microcomputer of the control unit. However, it is not necessary for this value to be calculated in the control unit, and it could be supplied to the control unit as an input signal from a separate unit.

I claim:

1. A control apparatus for a vehicle equipped with an engine comprising:
   an electrically powered actuator;
   condition sensing means for sensing a condition indicating a capacity of a battery of the vehicle; and
   actuator control means responsive to the condition sensing means for controlling a drive current for the actuator in accordance with the sensed condition of the battery, wherein the actuator control means comprises means for reducing the drive current for the actuator to a lower, finite, non-zero value when the capacity of the battery is below a prescribed level.

2. A control apparatus as claimed in claim 1, wherein the condition sensing means comprises a voltage sensor for sensing a voltage of the battery, and the actuator control means comprises means for reducing the drive current for the actuator when the battery voltage is below a first voltage.

3. A control apparatus as claimed in claim 2, wherein the actuator control means reduces the drive current only when the voltage is between the first voltage and a second nonzero voltage lower than the first voltage.

4. A control apparatus as claimed in claim 1, wherein:
the condition sensing means comprises a specific gravity sensor for sensing a specific gravity of battery fluid of the battery; and
the actuator control means reduces the drive current when the specific gravity is below a prescribed value.

5. A control apparatus as claimed in claimed in 1 further comprising speed sensing means for sensing the rotational speed of the engine of the vehicle, wherein the actuator control means comprises means for reducing the drive current only when the rotational speed is below a prescribed speed.

6. A control apparatus as claimed in claim 1, wherein the actuator control means comprises:,
a switching element having resistance neons connected in series with the actuator and switchable between a first setting having a first resistance and a second setting having a second resistance higher than the first resistance; and
switching control means for switching the switching element from the first setting to the second setting when the battery capacity is below the prescribed level.

7. A control apparatus as claimed in claim 1 wherein:
the actuator comprises means for adjusting the rotational speed of the engine; and
the actuator control means comprises means for adjusting the drive current for the actuator so as to increase the engine speed when the battery capacity is below a prescribed level.

8. A control apparatus as claimed in claim, 7 further comprising gear position sensing means for sensing a gear position of a transmission of the vehicle, wherein the actuator control means comprises means for adjusting the drive current to increase the engine speed only when the gear position sensing means senses that the transmission is in neutral.

9. A control apparatus as claimed in claim 7 wherein the actuator comprises means for opening a bypass valve for a throttle bypass for the engine when the battery capacity is below the prescribed level.

10. A control apparatus as claimed in claim 7 wherein the actuator comprises means for increasing the opening of a throttle valve of the engine when the battery capacity is below the prescribed level.

11. A control apparatus as claimed in claim 7 wherein the actuator comprises an ignition coil, and the actuator control means comprises means for advancing a firing angle of the ignition coil when the battery capacity is below the prescribed level.

12. A control method for a vehicle equipped with an engine comprising:
sensing the capacity of a battery of the vehicle; and
controlling a drive current for an electrically powered actuator for the vehicle according to the senses capacity, wherein the step of controlling the drive current comprises the step of decreasing the drive current for the actuator to a lower, finite, non-zero value when the sensed capacity of the battery is below a prescribed level.

13. A control method as claimed in claim 12 comprising sensing a voltage of the battery and decreasing the drive current when the voltage is below a first voltage.

14. A control method as claimed in claim 13 comprising decreasing the drive current only when the sensed voltage is in a range between the first voltage and a second nonzero voltage lower than the first voltage.

15. A control method as claimed in claim 12 comprising varying the drive current of an actuator so as to increase the engine rotational speed when the battery capacity is below the prescribed level.

* * * * *